(12) United States Patent
Gianone et al.

(10) Patent No.: US 10,502,311 B2
(45) Date of Patent: Dec. 10, 2019

(54) METHOD OF CONTROLLING OPERATION OF A VEHICLE

(75) Inventors: Roberto Gianone, Barengo (IT); Chiara Cesari, Novara (IT); Marco Bassi, Novate Milanese (IT); Marco Fratelli, Vigevanoo (IT)

(73) Assignee: Meritor Technology, Inc., Troy, MI (US)

( * ) Notice: Subject to any disclaimer, the term of this patent is extended or adjusted under 35 U.S.C. 154(b) by 1098 days.

(21) Appl. No.: 12/824,472

(22) Filed: Jun. 28, 2010

(65) Prior Publication Data
US 2010/0332089 A1 Dec. 30, 2010

(30) Foreign Application Priority Data
Jun. 30, 2009 (GB) .................................. 0911283.0

(51) Int. Cl.
*F16H 57/04* (2010.01)
(52) U.S. Cl.
CPC ....... *F16H 57/0447* (2013.01); *F16H 57/045* (2013.01); *F16H 57/0409* (2013.01); *F16H 57/0443* (2013.01); *F16H 57/0483* (2013.01)
(58) Field of Classification Search
CPC .. F16H 57/04; F16H 57/0401; F16H 57/0402; F16H 57/0405; F16H 57/0407; F16H 57/0408; F16H 57/0442; F16H 57/0443; F16H 57/0445; F16H 57/0447; F16H 57/0449; F16H 57/045; F16H 57/0452; F16H 57/0456; F16H 57/0457; F16H 57/0483; F16H 57/0409; F16H 57/05; F16H 57/409; Y10T 74/2186; Y10T 74/2188

USPC ............. 701/51; 477/98; 475/159, 160, 220; 74/467, 468, 606 R, 607; 184/6.12, 11.1, 184/11.2, 104.1–104.3, 6.13
See application file for complete search history.

(56) References Cited

U.S. PATENT DOCUMENTS 4,095,675 A    6/1978   Bell
4,762,201 A *   8/1988   Malik ........................ 184/6.13
(Continued)

FOREIGN PATENT DOCUMENTS

DE              3523761 A1    1/1986
DE     102009017938 A1    10/2010
(Continued)

OTHER PUBLICATIONS

Merriam Webster's Collegiate Dictionary, Tenth Edition, copyright 1997, p. 607, (Year: 1997).*
(Continued)

*Primary Examiner* — Jeffrey A Shapiro
(74) *Attorney, Agent, or Firm* — Brooks Kushman P.C.

(57) ABSTRACT

A method of controlling a fluid level around a transmission gear of a vehicle includes the steps of providing a set of predetermined operating conditions, each predetermined operating condition having a corresponding predetermined fluid level requirement, operating the vehicle at an actual operating condition, determining a predetermined operating condition equivalent to the actual operating condition, and arranging the fluid level around the transmission gear to be equivalent to the predetermined fluid level requirement corresponding to the predetermined operating condition.

20 Claims, 3 Drawing Sheets

(56) References Cited

U.S. PATENT DOCUMENTS

| | | | |
|---|---|---|---|
| 5,101,936 A * | 4/1992 | Paredes | F01M 1/12 |
| | | | 123/196 S |
| 5,662,188 A * | 9/1997 | Ito | B62D 5/07 |
| | | | 184/11.1 |
| 6,092,628 A * | 7/2000 | Hinton | F16H 57/0412 |
| | | | 184/104.1 |
| 6,132,329 A | 10/2000 | Tison | |
| 6,189,655 B1 | 2/2001 | Scheib et al. | |
| 6,227,221 B1 * | 5/2001 | Schmitz | 137/1 |
| 6,227,333 B1 | 5/2001 | Scheib et al. | |
| 6,267,203 B1 | 7/2001 | Brissette et al. | |
| 6,299,561 B1 * | 10/2001 | Kramer | F16H 57/0447 |
| | | | 184/13.1 |
| 6,457,564 B1 * | 10/2002 | Damm et al. | 184/6.5 |
| 6,692,402 B2 * | 2/2004 | Nakamori et al. | 477/3 |
| 6,840,889 B2 * | 1/2005 | Aoki et al. | 477/156 |
| 6,843,746 B2 | 1/2005 | Hayes et al. | |
| 6,913,558 B2 * | 7/2005 | Mori et al. | 477/3 |
| 6,928,976 B2 * | 8/2005 | Håkansson | 123/196 R |
| 6,938,585 B2 * | 9/2005 | Schneider | 123/1 A |
| 7,003,388 B2 * | 2/2006 | Nakamura | 701/67 |
| 7,055,486 B2 * | 6/2006 | Hoff et al. | 123/196 R |
| 7,059,460 B2 * | 6/2006 | Duan et al. | 192/70.12 |
| 7,150,333 B2 * | 12/2006 | Noda et al. | 180/65.26 |
| 7,395,803 B2 * | 7/2008 | Ledger et al. | 123/196 R |
| 7,465,250 B2 * | 12/2008 | Tamai et al. | 477/3 |
| 7,556,120 B2 * | 7/2009 | Sah et al. | 180/305 |
| 7,568,990 B2 * | 8/2009 | Sah et al. | 475/117 |
| 7,951,043 B2 * | 5/2011 | Reisch et al. | 477/156 |
| 7,958,983 B2 * | 6/2011 | Schiele et al. | 192/85.61 |
| 7,972,241 B2 * | 7/2011 | Schiele et al. | 477/98 |
| 8,068,966 B2 * | 11/2011 | Wu et al. | 701/60 |
| 8,392,047 B2 * | 3/2013 | Dreier | B60R 16/0234 |
| | | | 477/76 |
| 8,468,982 B2 * | 6/2013 | Johnson et al. | 123/1 A |
| 2002/0028725 A1 * | 3/2002 | Totsuka | F16H 57/0434 |
| | | | 477/45 |
| 2002/0055415 A1 * | 5/2002 | Yoshikawa | F16D 48/08 |
| | | | 477/166 |
| 2003/0059310 A1 | 3/2003 | Koenig et al. | |
| 2004/0149505 A1 * | 8/2004 | Burns et al. | 180/197 |
| 2004/0178900 A1 * | 9/2004 | Berndorfer | F01M 1/18 |
| | | | 340/450.3 |
| 2005/0125148 A1 * | 6/2005 | Van Buer | G01C 21/3617 |
| | | | 701/468 |
| 2005/0172927 A1 * | 8/2005 | Hunt | F01M 1/02 |
| | | | 123/196 W |
| 2006/0037387 A1 * | 2/2006 | Utz | F01M 11/10 |
| | | | 73/114.55 |
| 2006/0180371 A1 * | 8/2006 | Breed et al. | 180/197 |
| 2007/0251348 A1 | 11/2007 | Hayes et al. | |
| 2008/0121464 A1 * | 5/2008 | Ledger et al. | 184/6.13 |
| 2008/0132381 A1 * | 6/2008 | Seid | F16H 59/72 |
| | | | 477/98 |
| 2008/0169030 A1 * | 7/2008 | Schoenek et al. | 137/434 |
| 2008/0185254 A1 * | 8/2008 | Turley | F16D 48/066 |
| | | | 192/58.61 |
| 2008/0221741 A1 * | 9/2008 | Pillar et al. | 701/1 |
| 2008/0262683 A1 * | 10/2008 | Ward | G05B 9/02 |
| | | | 701/51 |
| 2008/0300746 A1 * | 12/2008 | Dreier | B60R 16/0234 |
| | | | 701/31.4 |
| 2008/0316006 A1 * | 12/2008 | Bauman et al. | 340/425.5 |
| 2009/0118953 A1 * | 5/2009 | Nakamura | F16H 41/30 |
| | | | 701/60 |
| 2009/0145211 A1 * | 6/2009 | Schneider | 73/114.55 |
| 2009/0235657 A1 * | 9/2009 | Rampen et al. | 60/456 |
| 2009/0312932 A1 * | 12/2009 | Wang | F02D 35/024 |
| | | | 701/102 |
| 2010/0018805 A1 * | 1/2010 | Sachdev et al. | 184/6.3 |
| 2010/0063694 A1 * | 3/2010 | Lee | B60W 10/02 |
| | | | 701/54 |
| 2010/0100301 A1 * | 4/2010 | Ma et al. | 701/102 |
| 2010/0228400 A1 * | 9/2010 | Johnson et al. | 700/283 |
| 2010/0300551 A1 * | 12/2010 | Yuen et al. | 137/3 |

FOREIGN PATENT DOCUMENTS

| | | | | |
|---|---|---|---|---|
| EP | 0895002 A2 | 2/1999 | | |
| GB | 2180603 A | 4/1987 | | |
| GB | 2322421 | 8/1998 | | |
| JP | 2005-114103 | 4/2005 | | |
| WO | WO 2008/108720 A1 * | 9/2008 | | F16H 57/04 |

OTHER PUBLICATIONS

United Kingdom Search Report for GB0911283.0 dated Oct. 26, 2009.

European Patent Office, Extended European Search Report for the corresponding European Patent Application No. 13181290.1 dated Sep. 18, 2013.

European Patent Office, Extended European Search Report for the corresponding European Patent Application No. 13181292.7 dated Sep. 18, 2013.

European Patent Office, Extended European Search Report for the corresponding European Patent Application No. 13181294.3 dated Sep. 18, 2013.

* cited by examiner

| Predetermined operating condition | Predetermined oil level requirement |
|---|---|
| Condition 1: oil temperature in sump region is at or below 90 °C | Level B |
| Condition 2: oil temperature in sump region is above 90 °C | Level A |

METHOD OF CONTROLLING OPERATION OF A VEHICLE

REFERENCE TO RELATED APPLICATION

This application claims priority to United Kingdom Application No. GB 0911283.0 filed Jun. 30, 2009.

BACKGROUND OF THE INVENTION

The present invention relates to controlling an oil level around a transmission gear of a vehicle, in particular to controlling the oil level in a driven axle of a vehicle.

A driven axle for automotive vehicles are known whereby a drive shaft aligned generally longitudinally relative to the vehicle drives a pinion which is in meshing engagement with a crown wheel in an axle housing. The crown wheel drives a right hand drive shaft connected to a right hand wheel and also drives a left hand drive shaft connected to a left hand wheel, thereby propelling the vehicle. Typically, the crown wheel will drive the right and left hand drive shafts via a differential assembly.

A lubricating fluid, typically oil, is provided in the axle housing for lubricating and cooling the crown wheel, the pinion, differential gears and associated bearings. However, the rotation of the crown wheel, the pinion and a differential housing in the oil leads to power losses due to oil churning, thereby increasing the overall fuel consumption of the vehicle.

SUMMARY OF THE INVENTION

A method of controlling a fluid level around a transmission gear of a vehicle includes the steps of providing a set of predetermined operating conditions, each predetermined operating condition having a corresponding predetermined fluid level requirement, operating the vehicle at an actual operating condition, determining a predetermined operating condition equivalent to the actual operating condition, and arranging the fluid level around the transmission gear to be equivalent to the predetermined fluid level requirement corresponding to the predetermined operating condition.

Advantageously, under arduous driving conditions, such as when the vehicle is fully loaded and ascending a hill, the oil level around the transmission gear can be increased, thereby both cooling and lubricating the transmission gear and reducing the likelihood of damage. However, when the vehicle is running under less arduous conditions, such as when it is unladen and driving along a flat good road surface at medium to low speeds, the oil level around the transmission gear can be reduced, thereby reducing the churning losses and improving the fuel consumption of the vehicle.

In one example, a predetermined operating condition is at least defined by a vehicle speed. In one example, a predetermined operating condition is at least defined by an amount of torque being transmitted through the transmission gear. In one example, a predetermined operating condition is at least defined by a direction of torque being transmitted through the transmission gear. In one example, a predetermined operating condition is at least defined by the fluid temperature. In one example, a predetermined operating condition is at least defined by a longitudinal inclination of the vehicle. In one example, a predetermined operating condition is at least defined by a lateral inclination of the vehicle. In one example, a predetermined operating condition is at least defined by a lateral acceleration of the vehicle. In one example, a predetermined operating condition is at least defined by a reverse gear ratio of the vehicle. In one example, a predetermined operating condition is at least defined by an amount of contaminant of the fluid. In one example, a predetermined operating condition is at least defined by a fluid quality. In one example, a predetermined operating condition is at least defined by a temperature of a transmission component. In one example, a predetermined operating condition is at least defined by a previous actual operating condition.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
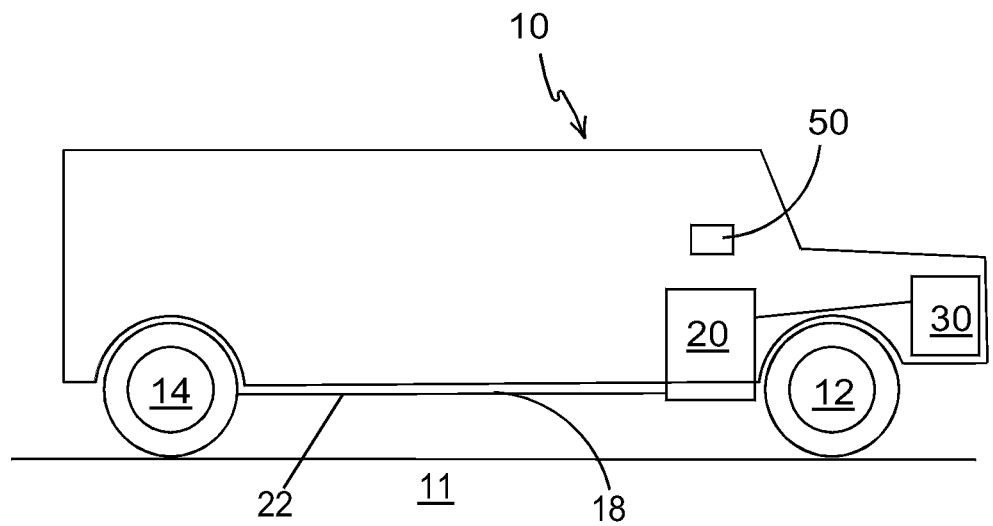
FIG. 1 is a schematic side view of a vehicle operated by a method according to the present invention.
Figure 2:
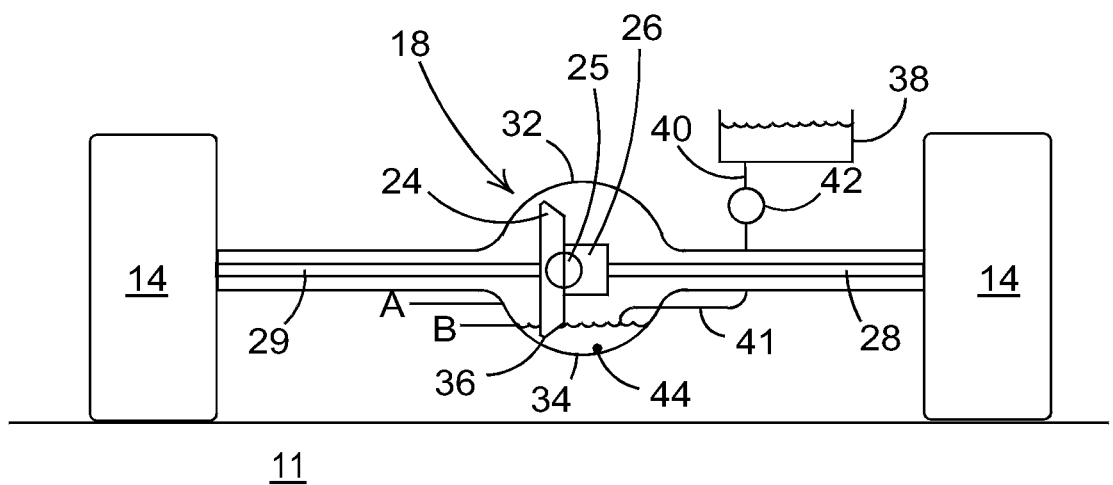
FIG. 2 is a schematic rear view of a driven axle of the vehicle of FIG. 1.

FIG. 1 shows a vehicle, in this case a lorry 10 or a truck on a road 11, the lorry 10 having front wheels 12 and rear wheels 14. The front wheels 12 are steerable wheels. The rear wheels 14 are driven by a transmission system 18. The transmission system 18 includes a gear box 20, a drive shaft 22, a crown wheel 24, a pinion 25, a differential assembly 26, a right half shaft 28 and a left half shaft 29. The gear box 20 is driven by an engine 30. As best seen in FIG. 2, the crown wheel 24, the pinion 25, the differential assembly 26, the right half shaft 28 and the left half shaft 29 are contained within an axle housing 32. The axle housing 32 includes a lubricating fluid, in this case oil 34, which, when the vehicle is stationary, sits in a sump region 36 of the axle housing 32 around the crown wheel 24.

Also provided is a reservoir 38 connected via appropriate pipes 40 and 41 to the sump region 36. Between the pipe 40 and the pipe 41 is an oil pump 42. The oil pump 42 can be operated in a first direction to pump oil 34 from the sump region 36 to the reservoir 38 and can also be operated in a second reverse direction to pump oil 34 from the reservoir 38 to the sump region 36. In this way, the oil level in the sump region 36 can be varied to suit the instantaneous driving conditions. A temperature sensor 44 is provided in the sump region 36 and monitors the temperature of the oil 34 within the sump region 36.

An electronic control unit (ECU) 50 includes a look up table (see FIG. 3) having a set of predetermined operating conditions, in this case two predetermined operating conditions, namely condition 1 and condition 2. Each predetermined operating condition has a corresponding predetermined oil level requirement associated with it. In one embodiment, the predetermined operating condition 1 is the oil temperature in the sump region 36 being at or below 90° C., and the predetermined operating condition 2 is the oil temperature in the sump region 36 being above 90° C. Each predetermined operating condition has a corresponding predetermined oil level requirement. In this case, with relatively cool oil, the predetermined oil level requirement is a level B (see FIG. 2) and with relatively hot oil, the predetermined oil level requirement is a level A (in this case above the level B).

A method of controlling the oil level in the sump region 36 depends upon the operating conditions of the vehicle. In this example, when the vehicle is operating under arduous conditions, the engine 30 will be producing maximum power. This will be transmitted via the transmission system 18 to the rear wheels 14 to propel the vehicle. The crown wheel 24 and the pinion 25 will therefore be transmitting the maximum power, and since in any geared system there is inevitably a small power loss due to friction between the gear teeth, when the crown wheel 24 and the pinion 25 are transmitting maximum power, then the power loss due to friction between the teeth will be greater. This in turn will tend to heat the oil 34 in the sump region 36, and the overall temperature will therefore increase, in this example to above 90° C. The temperature sensor 44 will monitor the oil temperature in the sump region 36 and transmit a signal to the ECU 50.

The ECU 50 will periodically compare the actual operating condition of the vehicle (in this case the actual temperature of the oil 34 in the sump region 36) with the predetermined operating conditions in the lookup table and determine which of the predetermined operating condition equates to the actual operating conditions. The ECU 50 will then determine the predetermined oil level requirement corresponding to the predetermined operating condition equivalent to the actual operating condition. Once the predetermined oil level requirement has been determined, the actual oil level in the sump region 36 will be adjusted to meet the predetermined oil level requirement (if such adjustment is required).

By way of example, consider the situation where the vehicle has been left stationary overnight. All components within the vehicle will have reached an ambient temperature of, for example, 15° C. When the vehicle is started for the first time, the temperature sensor 44 will send a signal to the ECU 50 which will determine that the oil temperature is 15° C. The ECU 50 will then determine which of the predetermined operating conditions equates to the actual operating condition. In this case, the predetermined operating condition number 1 (the oil temperature in the sump region is at or below 90° C.) equates to the actual operating conditions of the vehicle (the oil temperature in the sump is 15° C.). The predetermined oil level requirement corresponding to the predetermined operating condition 1 is the level B, and as shown in FIG. 2, the oil level is in fact at the level B. As such, the ECU 50 determines (as discussed below) that the oil level around the transmission gear is in fact equivalent to the predetermined oil level requirement level B and hence it is not necessary to operate the pump 42.

As the vehicle is then driven, the ECU 50 will periodically compare the actual oil temperature in the sump region 36 to the predetermined operating conditions, and while the oil temperature in the sump region 36 remains at or below 90° C., the pump 42 will not be operated. Eventually, the oil temperature in the sump region 36 will go above 90° C. When the ECU 50 makes a period check of the oil temperature under these conditions, it will determine that the predetermined operating condition equivalent to the actual operating condition will now be the predetermined operating condition 2.

Figures 3, 4:
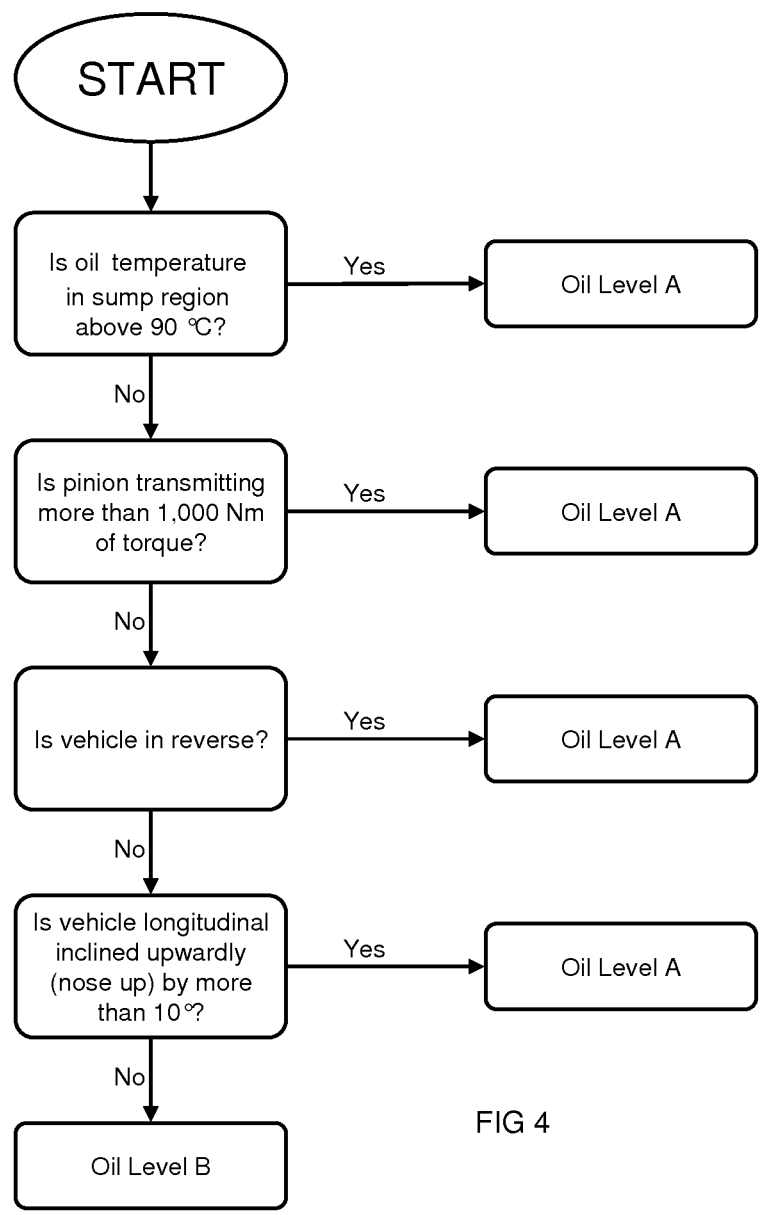
FIG. 3 is a look up table found in the ECU of the vehicle of FIG. 1.
FIG. 4 is a flow diagram indicating one embodiment of a method according to the present invention.

As shown in FIG. 3, the predetermined oil level requirement equivalent to the predetermined operating condition 2 is the level A. In this example, the amount of oil required to raise the oil level in the sump region 36 from the level B to the level A is equal to the amount of oil 34 held in the reservoir 38, as shown in FIG. 2. In other words, for the oil level in the sump region 36 to be raised to the level A, all the oil 34 in the reservoir 38 must be pumped by the pump 42 into the sump region 36. The ECU 50 therefore instructs the pump 42 to pump oil 34 from the reservoir 38 for a predetermined amount of time, for example 30 seconds. In this case, the predetermined time is arranged such that under all temperature conditions of the oil 34 in the reservoir 38, all of the oil 34 will be transferred to the sump region 36. Thus, it is not necessary to have an oil level height sensor in the sump region 36 to measure the oil level.

For the purposes of this example, it is assumed that the oil temperature in the sump region 36 remains above 90° C. for the remainder of the journey of the vehicle. The vehicle is then left overnight, and the oil temperature drops to an ambient temperature of, for example, 15° C. When the engine is next started, the ECU 50 will determine that the actual operating condition (the oil 34 at 15° C.) is equivalent to the predetermined operating condition 1 and that the predetermined oil level requirement is the level B. The ECU 50 therefore determines that it is necessary to drop the oil level from the level A down to the level B, and the pump 42 is therefore operated to pump oil 34 from the sump region 36 to the reservoir 38. Note that the inlet to the pipe 41 is positioned at the same height as the level B. Thus, the pump 42 can never lower the oil level in the sump region 36 to a level lower than level B. In this way, it is not necessary to have a separate oil level sensor in the sump region 36.

The ECU 50 stores the last event that the pump 42 was instructed to perform. Thus, knowing that the last event of the oil pump 42 was to pump oil 34 from the sump region 36 to the tank, if, on a periodic check of the oil temperature in the sump region 36, the actual operating condition equates to the predetermined operating condition 1, then no further action need be taken by the pump 42. Similarly, knowing the last action carried out by the oil pump 42 was to transfer the oil 34 from the reservoir 38 to the sump region 36 and, during a period check, it is determined that the actual operating conditions equate to the predetermined operating condition 2, means again that no action need be taken by the oil pump 46 because the oil level in the sump region 36 will already be at the level A. Conversely, if the last pump event is to pump oil 34 from the sump region 36 to the reservoir 38 and it is determined that the oil level in the sump region 36 needs to be increased to the level A, then the ECU 50 can instruct the pump 46 to transfer oil 34 accordingly. Similarly, if the last pumping event was to pump oil 34 from the reservoir 38 to the sump region 36 and it is determined that the oil level in the sump region 36 needs to be at the level B, the ECU 50 can instruct the pump 46 to transfer the oil 34 to the reservoir 38 to reduce the level of oil 34 in the sump region 36.

In an alternative embodiment, the ECU 50 need not store the last instruction sent to the oil pump 46. Under these circumstances, at every periodic check of actual operating conditions, the pump 46 will be instructed to either pump oil 34 to or from the sump region 36. If the level in the sump region 36 is at the level A and the pump 46 is instructed to pump oil 34 from the sump region 36 to the reservoir 38, then the oil level will fall from the level A to the level B. Alternatively, if the oil level in the sump region 36 is already at the level B and the pump 46 is instructed to pump oil 34 from the sump region 36 to the reservoir 38, then the pump 46 will operate, but no oil 34 will be transferred. Such an arrangement requires a less complicated control system. In the example above, the predetermined operating condition was defined by a temperature of the oil 34 in the sump region 36.

Alternative embodiments could monitor other operating conditions of the vehicle. For example, the torque being transmitted through the crown wheel 24 and the pinion 25 could be monitored. Under high torque conditions, a higher oil level would be required and under low torque conditions, a lower oil level would be required.

In an alternative embodiment, the speed of the vehicle could be monitored.

In an alternative embodiment, the direction of torque being transferred by the crown wheel 24 and the pinion 25 could be monitored. Thus, under normal driving conditions, power is transferred from the engine to the rear wheels 14. However, under engine braking conditions, the power (and hence torque) is transferred in an opposite sense i.e., it is transferred from the wheels to the engine.

In an alternative embodiment, the inclination of the vehicle could be monitored, in particular the longitudinal inclination and/or the lateral inclination.

In an alternative embodiment, the acceleration of the vehicle could be monitored, in particular the longitudinal acceleration (or deceleration) or the lateral acceleration.

In a further embodiment, the gear ratio of the vehicle could be monitored. In particular, monitoring of whether or not the vehicle is in a reverse gear could be carried out. When the vehicle is in a reverse gear, the crown wheel 24 is spinning in a reverse sense, and oil picked up by a crown wheel tooth travelling through the sump region 36 will be flung rearwardly. When the vehicle is travelling in a forward direction, the oil is picked up by the gear teeth and flung forward, typically into a channel which then feeds the pinion bearings. Thus, when the vehicle is travelling in reverse, this oil feed is reduced, and hence, depending upon the particular installation, increasing the oil level within the sump region 36 can be beneficial to the life of the pinion bearings.

In an alternative embodiment, the accelerator pedal position could be monitored.

In an alternative embodiment, the quality of the oil could be monitored. Thus, oil quality sensors are known which can monitor contaminants and/or oil degradation. When the oil quality is good, the oil level can be relatively low, whereas when the oil quality is poor, then it is advantageous to increase the oil level in the sump region 36.

Figure 5:
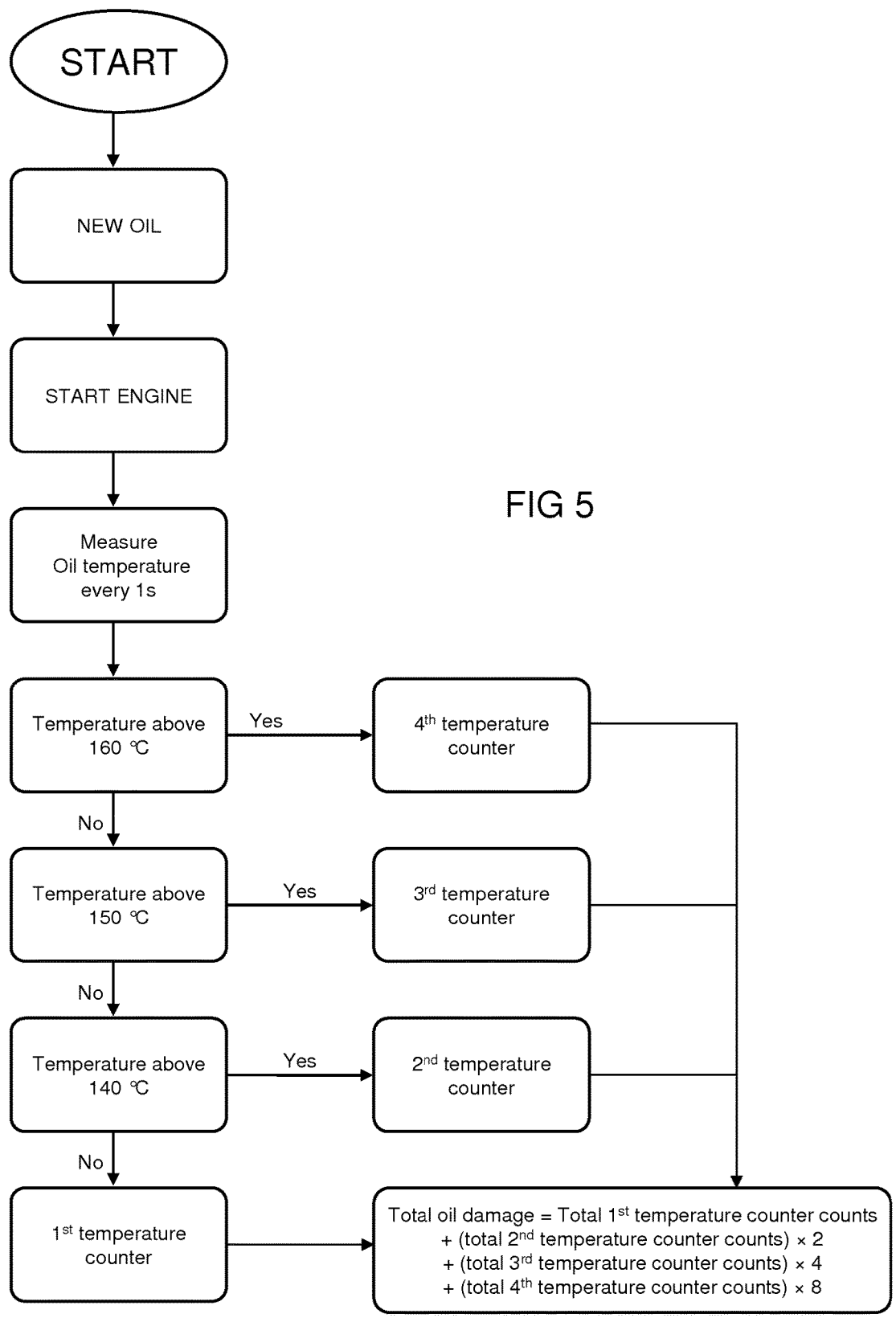
FIG. 5 is a flow diagram showing a way of calculating an oil quality.

It is possible to estimate an oil quality based upon driving history, in particular, the temperature of the oil over the historical period. Thus, FIG. 5 shows a flow diagram wherein a periodic count of the oil temperature in the sump region 36 is made. In this case, the count is made every second, although in further embodiments, more frequent or less frequent counts can be made. After a service, when there is new oil in the sump region 36, the total damage count is set to zero. When the engine is started, counting starts and when the engine is stopped, counting stops. However, in further embodiments, alternative count start and count stop criteria could be used, for example, counting could start when the vehicle is in motion and counting could stop when the vehicle is stationary. If the temperature of the oil in the sump region 36 is above 160° C., then the fourth temperature counter will add one count. If the temperature is not above 160° C., but above 150° C., then the third temperature counter will add one count. If the temperature is not above 150° C., but above 140° C., the second temperature count will add one count. If the temperature is not above 140° C., the first temperature counter will add one count. Because oil degrades faster at a higher temperature than at a lower temperature, the counts from the first, second, third and fourth temperature counters are weighted appropriately. Thus, a count from the first temperature counter is not weighted, a count from the second temperature counter is weighted by two, a count from the third temperature counter is weighted for four, and a count from the fourth temperature counter is weighted by eight. The total oil damage equals the total first temperature counter counts plus (the total second temperature counter counts×2) plus (the total third temperature counter counts×4) plus (the total fourth temperature counter counts×8). Once the total oil damage counts exceeds a predetermined value, then the oil level in the sump region 36 could be increased from the oil level B to the oil level A. In further embodiments, there could be more than or less than four temperature counters. In further embodiments, the temperature at which a count takes place could be different from those mentioned above. In further embodiments, the weighting applied to each temperature count could be weighted differently from those mentioned above.

In an alternative embodiment, it is possible to predict a future event (typically an imminent future event), with a reasonable degree of certainty, that may require the fluid level around a transmission gear to be altered. Thus, ground positioning systems (GPS) are known to be mounted in vehicles and can therefore determine the actual position of the vehicle. Such vehicle mounted GPS systems often include a route guidance system providing a route for the vehicle driver to follow so the driver can get to the required destination efficiently. The present invention may utilize route guidance systems that include information about road conditions, such as road gradients (uphill and downhill), and road type, such as motorways (freeway), dual carriageway, single carriageway, and single track roads. The systems may also include information about road intersections, such as roundabouts, traffic lights, stop signs, etc. The system may also carry information concerning speed limits on each road.

By way of example, if a vehicle is travelling along a motorway in a certain direction at a certain speed (such as 60 mph), the likelihood of that vehicle still being on that motorway, travelling in that direction, at approximately 60 mph in 10 seconds time is extremely high. If, within that 10 second period, the vehicle reaches and starts to ascend a hill (where an increase in the fluid level around transmission gear is required), then a computer system monitoring the direction and speed of travel of the vehicle together with the vehicle's instantaneous position can, using gradient information from the route guidance system, predict, with a reasonable degree of certainty, the approaching hill and hence the imminent need to increase the fluid level around the transmission gear. Depending upon the system used to transfer additional fluid into the region around the transmission gear, this may take a short period of time, by way of example, 5 seconds. As will be appreciated, such a predicting system will enable the fluid level around the transmission gear to be increased prior to the actual requirement for an increase in fluid level around the transmission gear, in this example, prior to the vehicle reaching the incline. Under these circumstances, the transmission gear will be better protected than if the fluid level around the transmission gear was increased only when the requirement for increasing the fluid level around the transmission gear actually arose. This is because under the latter circumstances, there is a time delay in actually increasing the fluid level around transmission gear, and hence, during this time delay, the transmission gear will be less protected and hence more liable to wear.

The fluid level around the transmission gear may need to be increased as a result of engine braking, and the system may be able to predict, with a reason degree of certainty, a requirement for engine braking. Thus, where the route guidance system recognizes a stop sign on the road ahead, there is a high likelihood of the vehicle actually stopping at that stop sign, and hence a high likelihood of braking, and in particular engine braking being required. Under these circumstances, the fluid level around the transmission gear may be increased. Similarly, the fluid level around the transmission gear of the vehicle may be increased when an acceleration requirement is predicted. Thus, after the vehicle has stopped at a stop sign, in order to reach its destination, it will inevitably be required to accelerate, and under these circumstances, the fluid level around the transmission gear can be maintained until such time as the vehicle has reached a "cruising" speed whereupon the fluid level may then be reduced. In urban environments, during rush hour, there tends to be a requirement for a lot of accelerating and braking, whereas outside of rush hour, the accelerating and braking requirement is less. Thus, by knowing the time of day (i.e., inside of a rush hour or busy period or outside of a rush hour or busy period) and by knowing the day of the week (i.e., a week day when rush hour is likely or a weekend when rush hour is less likely), it is possible to predict a likely amount of acceleration and braking, and the fluid level around the transmission gear can be controlled accordingly.

Different drivers have different driving styles. Some drivers accelerate relatively slowly and may brake early, whereas other drivers will accelerate relatively fast and brake relatively late, in particular using engine braking to brake late. It is possible for a computer to determine a driver's style and therefore predict a fluid level requirement around a transmission gear according to such information. Thus, a predetermined operating condition according to the present invention may be at least defined by a predicted future operating condition.

Thus, according to one embodiment, a method of controlling a fluid level around a transmission gear of a vehicle includes the step of determining a current operating condition of the vehicle, predicting a future operating condition of the vehicle based upon the current operating condition of the vehicle, and controlling a fluid level around a transmission gear of the vehicle based upon the predicted future operating condition of the vehicle.

As will be appreciated, because the time taken to increase a fluid level around a transmission gear is relatively short, typically less than 20 seconds, preferably less than 10 seconds, then the predicting of future operating conditions need only be a prediction of the operating conditions in 20 seconds time, preferably 10 seconds time, and as such, the prediction may be more accurate than if predicting further into the future.

In an alternative embodiment, the temperature of a transmission component could be monitored. Thus, rather than monitoring the temperature of the oil in the sump region 36, the temperature of one or more of the pinion bearings could be directly measured. When the pinion bearing itself becomes relatively hot, then the oil level in the sump region 36 could be increased. In certain embodiments, it may be easier to monitor other transmission components, in particular the temperature of a housing immediately surrounding the pinion bearing, or another bearing housing within a rear axle.

In each example above, only one operating condition will use to determine the required oil level in the sump region 36. In further embodiments, two or more operating conditions could be used to determine an appropriate oil level in the sump region 36. FIG. 4 shows a flow chart where four vehicle operating conditions are monitored, namely the oil temperature in the sump region 36, the torque being transmitted by the crown wheel 24 and the pinion 25, the gear selected in the gear box and the vehicle longitudinal inclination.

In the examples above, there are only two predetermined oil level requirements A and B. In further embodiments, there may be three or more predetermined oil level requirements. Under such circumstances, it may be necessary to monitor the oil level in the sump region 36 to ensure a correct oil level. Alternatively, knowing the total quantity of oil in this system and monitoring the oil level in the reservoir 38 will allow the oil level in the sump region 36 to be determined by calculation. Monitoring the oil level in the reservoir 38 may be advantageous because there are no gears or the like to churn and disturb the oil level.

As mentioned above, in order to increase the oil in the sump region 36 from the level B to the level A, the pump 42 is turned on to pump all the oil from the reservoir 38 into the sump region 36. In this example, the reservoir 38 is positioned above level A and hence alternatively a simple valve could be provided which, when opened, would allow all the oil to drain from the reservoir 38 into the sump region 36. Note that such a valve arrangement could also be used even when part of the reservoir 38 is below the level A or the level B. Under these circumstances, by opening the valve, the oil level in the sump region 36 and the oil level in the reservoir 38 would simply both come to the same level.

Where a reservoir 38 is used to store oil, when the level of oil in the sump region 36 is relatively low, any method can be used to transfer oil between the sump region 36 and the reservoir 38. The example above, a reversible pump is used, and in further embodiments, two one-way pumps can be used, the first pump being used to pump fluid to the reservoir 38, and the second pump being used to pump fluid to the sump region 36, each having suitable pipe work connections. Alternatively, a one-way pump can be used with an inlet being taken either from the sump region 36 or the reservoir 38 and being controlled via a valve, the outlet being pumped to either the sump region 36 or the reservoir 38 under the control of a second valve.

As mentioned above, gravity feed can be used to transfer oil from the reservoir 38 to the sump region 36 when the oil level in the reservoir 38 is above the oil level in the sump region 36. Alternatively, the reservoir 38 could be positioned below the oil level in the sump region 36 and gravity feed could be used to transfer oil from the sump region 36 to the reservoir 38.

As described above, the predetermined operating condition is based on a current operating condition of the vehicle. Thus, in the example shown in FIG. 3, if the oil temperature is below 90° C., the oil level is relatively low. If the oil temperature rises to above 90° C., then the oil level is increased. If the oil temperature subsequently falls to below 90° C., then the oil level correspondingly falls to a relatively low level.

However, certain actual operating conditions are indicative of a problem. Thus, if the temperature raises to an excessive amount (for the purposes of this example to above 130° C.), then this is indicative of excessive friction being generated and hence may indicate imminent bearing failure. Furthermore, oils are designed to operate within a certain temperature range, and if they operate above that temperature range, they may degrade, and their lubricating properties may not be as good when the temperature falls to the normal operating temperature. Thus, in the event of an abnormal operating condition, such as the oil temperature exceeding 130° C., it is advantageous to increase the oil level around the gear and then maintain that increased oil level even if the oil temperature drops below 90° C. (in the FIG. 3 example). Thus, the predetermined operating condition may depend upon a previous operating condition of the vehicle. In the present example, the predetermined operating condition is "Has the oil temperature been above 130° C.". If this operating condition is met, then the oil level may be raised to the oil level A and remain at the oil level A until the system has been reset when the axle is serviced, the oil has been changed, and the potential problem (such as bearing failure) has been rectified by, for example, replacing the bearing.

As described above, under normal operating conditions, either a pump can be used to transfer oil between a reservoir and an area around the transmission gear, or depending on the relative heights of the reservoir and the area around the transmission gear, gravity feed via a valve can be used. As such, whichever transfer system is used, as described, there is a single system used to transfer oil during normal operating conditions.

However, during abnormal operating conditions, it may be advantageous to have a secondary "emergency" system to transfer oil to raise the level around the transmission gear. Preferably, such a secondary system is less dependent upon the control system, and in particular, may be completely independent of the control system. Thus, where the reservoir is positioned above the area around the transmission gear, a tube or other conduit could be connected between the bottom of the reservoir and the bottom of an area of oil around the transmission gear. The end of the tube positioned near the gear could be blocked with a material that melts at a predetermined temperature, for example 130° C. Thus, when the oil temperature reached 130° C., the material would melt, ensuring that all the oil drained from the reservoir and that the reservoir could not refilled, i.e., the oil level around the transmission gear was maintained at a maximum level irrespective of the subsequent operating conditions, and in particular the temperature of the oil. It will be appreciated that this material effectively operates as a second valve.

As mentioned above, there are various predetermined operating conditions that can be defined, depending upon the particular embodiment. The actual operating condition will be measured by an appropriate sensor. For example, temperature sensors, vehicle speed sensors, torque sensors, sensors detecting a direction of torque being transmitted, accelerometers, inclinometers, gear ratio sensors or accelerator pedal position sensors. When it is necessary to monitor an oil level, in particular an oil level in the sump region 36, appropriate oil level sensors can be used.

Clearly, certain sensor may be positioned anywhere on the vehicle. A controller-area network (CAN) or a CAN-bus can be used to interconnect the various components of the present application.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of controlling a fluid level around a transmission gear of a vehicle, the method comprising the steps of:
   (a) storing a set of predetermined operating conditions in an electronic control unit, each predetermined operating condition having a corresponding predetermined fluid level requirement including a first predetermined operating condition having a first fluid level and a second predetermined operating condition having a second fluid level, each of the first and second fluid levels providing lubrication to the transmission gear;
   (b) operating the vehicle at an actual operating condition;
   (c) using the electronic control unit to determine a predetermined operating condition equivalent to the actual operating condition;
   (d) providing a sump region around the transmission gear and providing a reservoir in fluid communication with the sump region; and
   (e) arranging a fluid level in the sump region to be equivalent to one of the first and second fluid levels by transferring fluid between the sump region and the reservoir,
   wherein the predetermined operating condition is at least defined by a predicted future operating condition determined by using at least a route guidance system that includes information about road conditions.

2. The method as defined in claim 1 wherein a corresponding predetermined fluid level requirement equates to transferring substantially all the fluid from the reservoir to the sump region.

3. The method as defined in claim 1 wherein one of said corresponding predetermined fluid level requirements equates to allowing the fluid in the reservoir to drain into the sump region.

4. The method as defined in claim 1 including at least one pump for transferring fluid between the reservoir and the sump region.

5. The method as defined in claim 4 wherein the pump includes at least one valve to control fluid transfer between the reservoir and the sump region.

6. A method of controlling a fluid level around a transmission gear of a vehicle, the method comprising the steps of:
   (a) storing a set of predetermined operating conditions in an electronic control unit, each predetermined operating condition having a corresponding predetermined fluid level requirement including a first predetermined operating condition having a first fluid level and a second predetermined operating condition having a second fluid level, each of the first and second fluid levels providing lubrication to the transmission gear;
   (b) operating the vehicle at an actual operating condition;
   (c) using the electronic control unit to determine a predetermined operating condition equivalent to the actual operating condition;
   (d) providing a sump region around the transmission gear and providing a reservoir in fluid communication with the sump region; and
   (e) arranging a fluid level in the sump region to be equivalent to one of the first and second fluid levels by transferring fluid between the sump region and the reservoir,
   wherein the predetermined operating condition is at least defined by a direction of torque being transmitted through the transmission gear.

7. The method as defined in claim 6 wherein a corresponding predetermined fluid level requirement equates to transferring substantially all the fluid from the reservoir to the sump region.

8. The method as defined in claim 6 wherein one of said corresponding predetermined fluid level requirements equates to allowing the fluid in the reservoir to drain into the sump region.

9. The method as defined in claim 6 including at least one pump for transferring fluid between the reservoir and the sump region.

10. A method of controlling a fluid level around a transmission gear of a vehicle, the method comprising the steps of:
   (a) storing a set of predetermined operating conditions in an electronic control unit, each predetermined operating condition having a corresponding predetermined fluid level requirement including a first predetermined operating condition having a first fluid level and a second predetermined operating condition having a second fluid level, each of the first and second fluid levels providing lubrication to the transmission gear;
   (b) operating the vehicle at an actual operating condition;
   (c) using the electronic control unit to determine a predetermined operating condition equivalent to the actual operating condition;
   (d) providing a sump region around the transmission gear and providing a reservoir in fluid communication with the sump region; and
   (e) arranging a fluid level in the sump region to be equivalent to one of the first and second fluid levels by transferring fluid between the sump region and the reservoir,
   wherein the predetermined operating condition is at least defined by a longitudinal inclination of the vehicle.

11. The method as defined in claim 10 wherein a corresponding predetermined fluid level requirement equates to transferring substantially all the fluid from the reservoir to the sump region.

12. The method as defined in claim 10 wherein one of said corresponding predetermined fluid level requirements equates to allowing the fluid in the reservoir to drain into the sump region.

13. The method as defined in claim 10 including at least one pump for transferring fluid between the reservoir and the sump region.

14. A method of controlling a fluid level around a transmission gear of a vehicle, the method comprising the steps of:
   (a) storing a set of predetermined operating conditions in an electronic control unit, each predetermined operating condition having a corresponding predetermined fluid level requirement including a first predetermined operating condition having a first fluid level and a second predetermined operating condition having a second fluid level, each of the first and second fluid levels providing lubrication to the transmission gear;
   (b) operating the vehicle at an actual operating condition;
   (c) using the electronic control unit to determine a predetermined operating condition equivalent to the actual operating condition;
   (d) providing a sump region around the transmission gear and providing a reservoir in fluid communication with the sump region; and
   (e) arranging a fluid level in the sump region to be equivalent to one of the first and second fluid levels by transferring fluid between the sump region and the reservoir,
   wherein the predetermined operating condition is at least defined by an amount of contaminant of the fluid.

15. The method as defined in claim 14 wherein a corresponding predetermined fluid level requirement equates to transferring substantially all the fluid from the reservoir to the sump region.

16. The method as defined in claim 14 wherein one of said corresponding predetermined fluid level requirements equates to allowing the fluid in the reservoir to drain into the sump region.

17. The method as defined in claim 14 including at least one pump for transferring fluid between the reservoir and the sump region.

18. A method of controlling a fluid level around a transmission gear of a vehicle, the method comprising the steps of:
   (a) storing a set of predetermined operating conditions in an electronic control unit, each predetermined operating condition having a corresponding predetermined fluid level requirement including a first predetermined operating condition having a first fluid level and a second predetermined operating condition having a second fluid level, each of the first and second fluid levels providing lubrication to the transmission gear;
   (b) operating the vehicle at an actual operating condition;
   (c) using the electronic control unit to determine a predetermined operating condition equivalent to the actual operating condition;
   (d) providing a sump region around the transmission gear and providing a reservoir in fluid communication with the sump region; and
   (e) arranging a fluid level in the sump region to be equivalent to one of the first and second fluid levels by transferring fluid between the sump region and the reservoir,
   wherein the predetermined operating condition is at least defined by a previous actual operating condition in such a way that, if the second predetermined operating condition is met, the control unit will maintain the second fluid level in the sump until a system reset is performed.

19. The method as defined in claim 18 wherein a corresponding predetermined fluid level requirement equates to transferring substantially all the fluid from the reservoir to the sump region.

20. The method as defined in claim 18 including at least one pump for transferring fluid between the reservoir and the sump region.

* * * * *